United States Patent
Farha

(10) Patent No.: US 9,437,860 B2
(45) Date of Patent: Sep. 6, 2016

(54) TRACTION BATTERY ASSEMBLY HAVING SNAP-IN BUS BAR MODULE

(71) Applicant: FORD GLOBAL TECHNOLOGIES, LLC, Dearborn, MI (US)

(72) Inventor: Eid Farha, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 113 days.

(21) Appl. No.: 14/548,923

(22) Filed: Nov. 20, 2014

(65) Prior Publication Data

US 2016/0149191 A1    May 26, 2016

(51) Int. Cl.
*H01M 2/20* (2006.01)
*H01M 2/30* (2006.01)

(52) U.S. Cl.
CPC .............. *H01M 2/206* (2013.01); *H01M 2/30* (2013.01); *H01M 2220/20* (2013.01)

(58) Field of Classification Search
CPC ........ H01M 2/20; H01M 2/202; H01M 2/22; H01M 2/26; H01M 2/204; H01M 2/206; H01M 2/226; H01M 2/30; H01M 2220/20; H01M 2/24
See application file for complete search history.

(56) References Cited

U.S. PATENT DOCUMENTS

| | | | |
|---|---|---|---|
| 6,391,489 B1 | 5/2002 | Winch et al. | |
| 2002/0006544 A1 | 1/2002 | Asaka et al. | |
| 2003/0141842 A1* | 7/2003 | Izawa | H01M 2/206 320/116 |
| 2007/0020513 A1* | 1/2007 | Medina | H01M 10/613 429/120 |
| 2008/0280198 A1* | 11/2008 | Kumar | H01M 2/1077 429/138 |
| 2009/0075163 A1 | 3/2009 | Shevock et al. | |
| 2009/0111015 A1 | 4/2009 | Wood et al. | |
| 2009/0181288 A1 | 7/2009 | Sato | |
| 2009/0297892 A1 | 12/2009 | Ijaz et al. | |
| 2012/0115016 A1 | 5/2012 | Kim | |
| 2012/0121966 A1* | 5/2012 | Kim | H01M 10/0436 429/158 |
| 2012/0129024 A1 | 5/2012 | Marchio et al. | |
| 2014/0308568 A1* | 10/2014 | Kim | H01M 2/30 429/158 |

* cited by examiner

*Primary Examiner* — Carlos Barcena
(74) *Attorney, Agent, or Firm* — David B. Kelley; Brooks Kushman P.C.

(57) ABSTRACT

A traction battery includes a cell having a terminal defining a surface with a top and at least one sidewall. The traction battery also includes a busbar having an interior defining a top engaging with the top of the terminal, and at least one side surface engaging with the sidewall. One of the side surface and the sidewall includes a projection and the other of the side surface and the sidewall includes a receptacle for receiving the projection.

19 Claims, 3 Drawing Sheets

TRACTION BATTERY ASSEMBLY HAVING SNAP-IN BUS BAR MODULE

TECHNICAL FIELD

The present disclosure relates to traction battery assemblies for motor vehicles and specifically to busbars for electrically connecting cells of the traction battery.

BACKGROUND

Vehicles such as battery-electric vehicles (BEVs), plug-in hybrid electric vehicles (PHEVs) and full hybrid-electric vehicles (FHEVs) contain a traction battery assembly to act as an energy source for the vehicle. The traction battery may include components and systems to assist in managing vehicle performance and operations. The traction battery may also include high voltage components. The individual cells of the traction battery are electrically connected in series or parallel with bus bars.

SUMMARY

In one embodiment, a traction battery includes a cell having a terminal defining a surface with a top and at least one sidewall. The traction battery also includes a busbar having an interior defining a top engaging with the top of the terminal, and at least one side surface engaging with the sidewall. One of the side surface and the sidewall includes a projection and the other of the side surface and the sidewall includes a receptacle for receiving the projection.

In another embodiment, a traction battery assembly includes a cell having a terminal with a base attached to the cell and a stud distal to the cell. The base has a larger footprint than the stud. The traction battery also includes a busbar defining an interior having an upper portion conforming in shape to the stud, and a lower portion conforming in shape to the base. The busbar is received over the terminal with the upper portion engaging the stud creating an interference fit between the busbar and the terminal.

In yet another embodiment, a traction battery assembly includes an array of cells having a plurality of terminals arranged in a row and extending along a length of the array. Each of the terminals is attached to one of the cells and defines a first shape. At least one busbar includes a pair of terminal portions that each defines a second shape conforming to the first shape. One of the terminal portions is received on one of the terminals and the other of the terminal portions is received on an adjacent terminal to electrically connect two of the cells. A busbar module extends along the length of the row and is disposed over the row. The busbar module includes busbar receiving portions aligned with the terminals. Each of the busbar receiving portions defines a third shape conforming to the first and second shapes. The at least one busbar is received within one of the busbar receiving portions.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
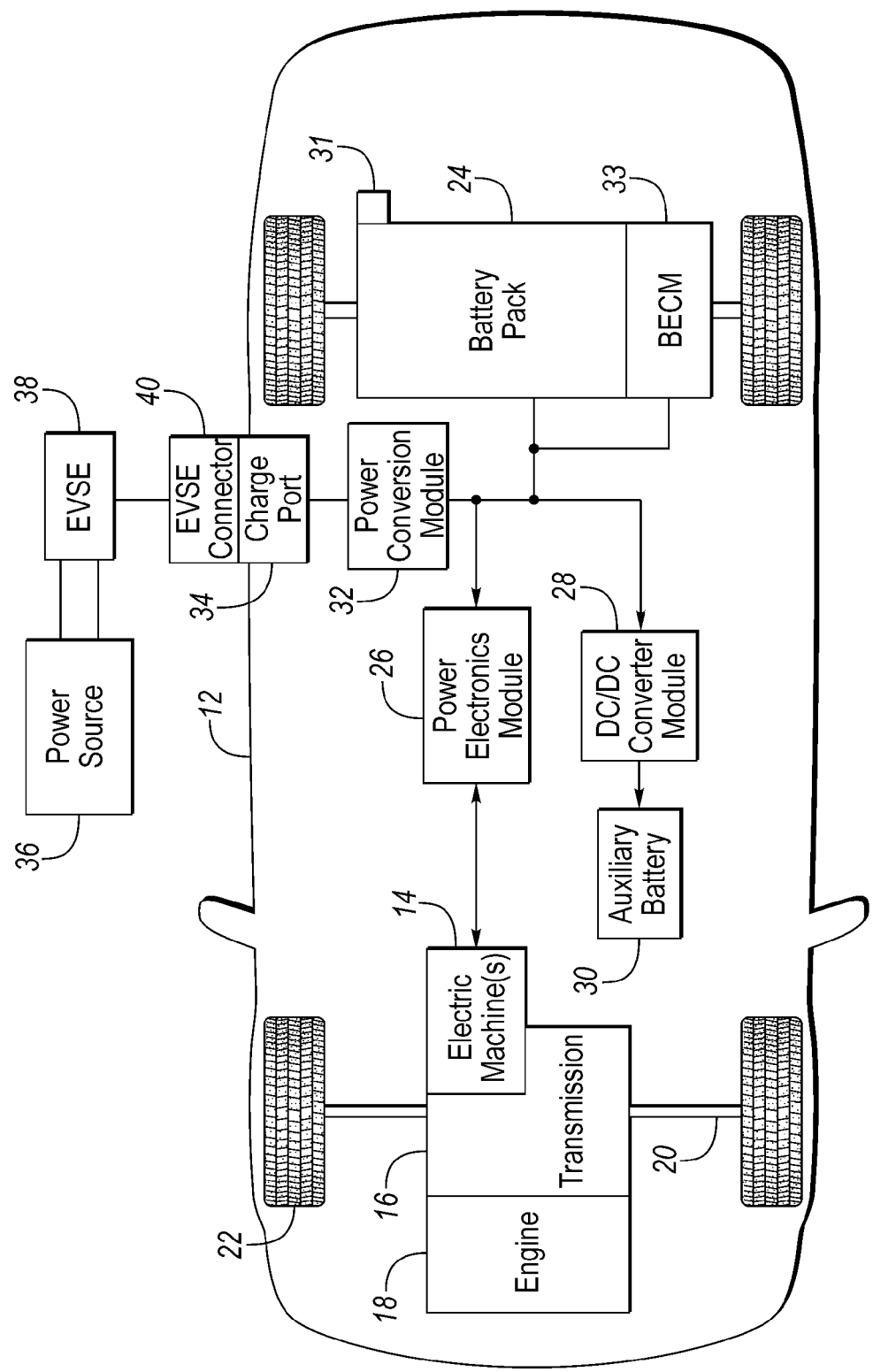
FIG. 1 is a schematic diagram of a typical plug-in hybrid-electric vehicle.

FIG. 1 depicts a schematic of a typical plug-in hybrid-electric vehicle (PHEV). Certain embodiments, however, may also be implemented within the context of non-plug-in hybrids and fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high voltage direct current (DC) output from one or more battery cell arrays, sometimes referred to as battery cell stacks, within the traction battery 24. The battery cell arrays may include one or more battery cells.

The battery cells, such as a prismatic or pouch cell, may include electrochemical cells that convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another.

Different battery pack configurations may be available to address individual vehicle variables including packaging constraints and power requirements. The battery cells may be thermally regulated with a thermal management system. Examples of thermal management systems may include air cooling systems, liquid cooling systems and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. In a pure electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 is a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via dedicated electrical conduits.

Figure 2:
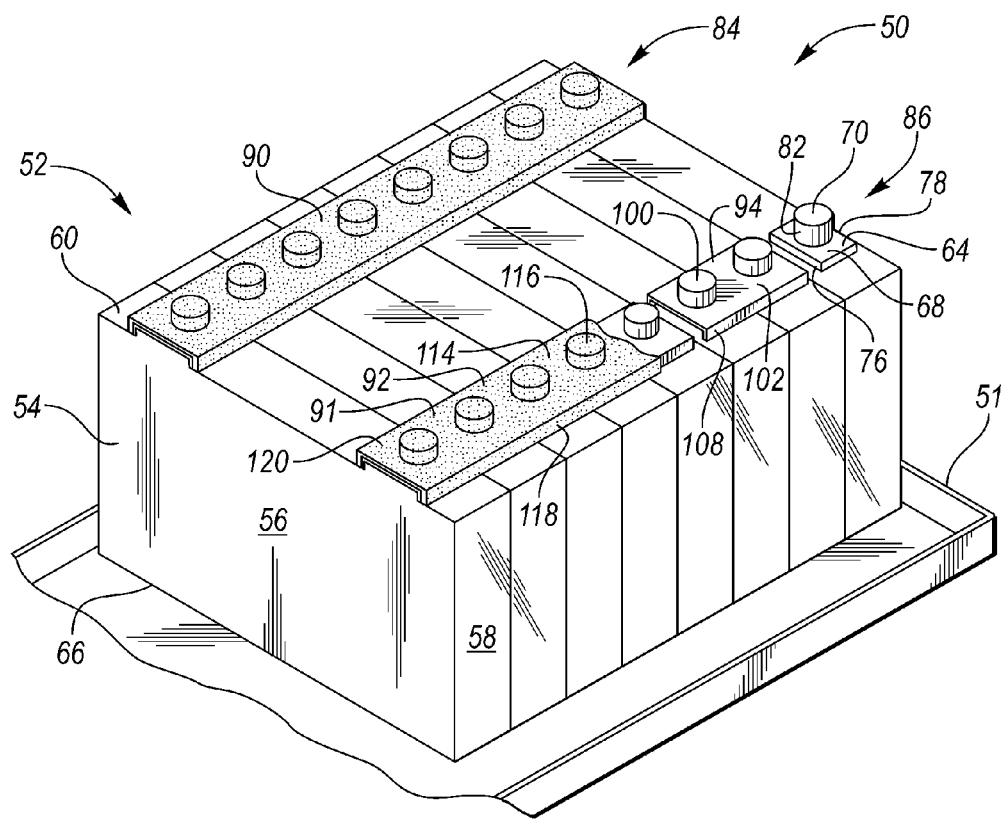
FIG. 2 is a perspective view of a battery assembly.
Figure 3:
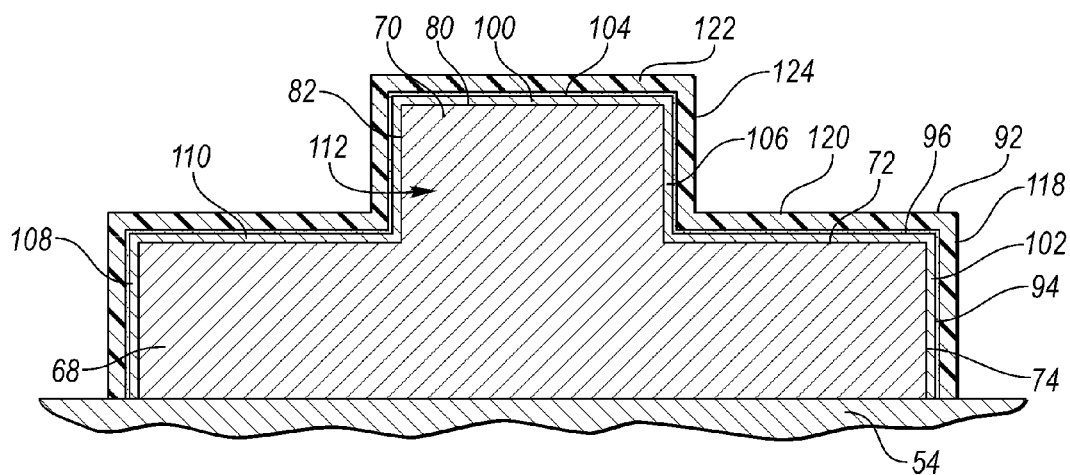
FIG. 3 is a section view of the battery assembly illustrating a cross-section of the terminal and busbar module.
Figure 4:
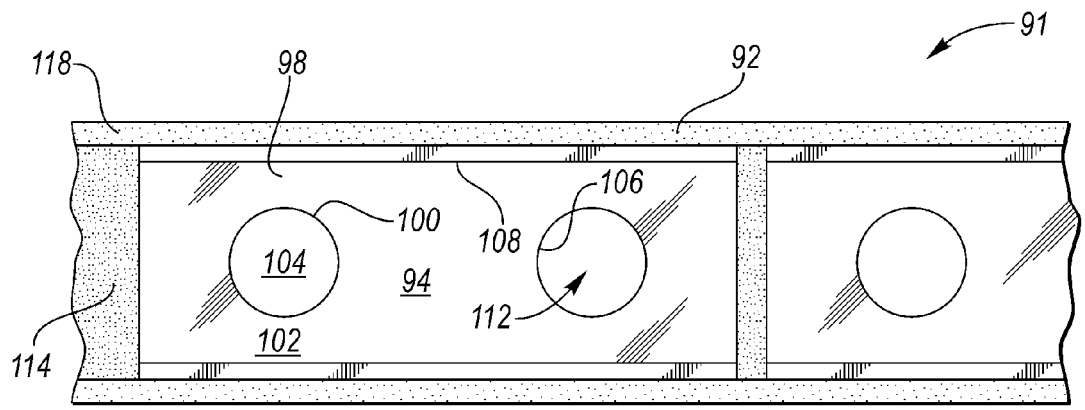
FIG. 4 is a bottom view of the busbar module.

FIGS. 2 through 6, and the related discussion, describe examples of the traction battery assembly 24. Referring to FIGS. 2, 3 and 4, a traction battery assembly 50 is shown. The traction battery assembly 50 includes a tray 51 that supports at least one battery array 52. The least one battery array 52 includes a plurality of stacked cells 54. Each battery cell 54 may be a prismatic cell having a tray side 66 disposed adjacent to the tray 51 and a terminal side 60 opposite the tray side 66. Each cell may also include opposing major sides 56 and opposing minor sides 58. The cells 54 are stacked in the array 52 with the major sides 56 of adjacent cells disposed against one another. The minor sides 58 of each cell collectively define opposing longitudinal sides of the array 52.

Each cell 54 includes at least one terminal 64 extending outwardly from the terminal side 60. For example, each cell 54 may include two terminals. The cells 54 may be aligned in a first terminal row 84 and a second terminal row 86. Each terminal 64 may include a base 68 and a stud 70. The base 68 is attached to the terminal side 60 of the cell 54 at a foot of the base 68. The base 68 in the stud 70 may be the same shape or may be a different shape. The base 68 may have a larger footprint than the stud 70. The base 68 includes a top 72, opposing sidewalls 74, front wall 76 and back wall 78 cooperating to define an outer surface of the base 68. The stud 70 is attached to the top 72 of the base 68 and extends away from the base 68. The stud 70 includes a top 80 disposed above the top 72 of the base 68. The top 80 is connected to the top 72 with sidewall 82. The top 80 and sidewall 82 cooperate to define an outer surface of the stud 70. In the illustrated embodiment, the base 68 shown as being prismatic and the stud 70 is shown as a circular cylinder. However, in other embodiments, the base 68 stud 70 may have different shapes. For example, the base 68 and the stud 70 may be prismatic.

A first busbar module 90 is disposed over the first terminal row 84 and a second busbar module 91 is disposed over the second terminal row 86. Each of the busbar modules extend along a length of the corresponding terminal row. The first busbar modules 90, 91 include a housing 92 and a plurality of busbars 94. The housing 92 may be made of plastic or other dielectric material. Each busbar module 90, 91 also includes a plurality of busbars 94 attached to the busbar module at specific locations to properly align the busbars with the terminals 64. The busbars 94 electrically connect select adjacent terminals to connect the cells of the array 52 in series or parallel. The housing 92 and the busbars 94 may be connected with dielectric adhesive 96. The busbar modules 90, 91 may be preassembled and then installed onto the cells 54.

Each busbar 94 includes a pair of terminal portions 98 that engage with the terminals 64. The terminal portions 98 are positioned on the busbar 94 to align with the terminals 64 of the cells 54. The terminal portions 98 may correspond in size and shape to the terminals to create an interference fit between the terminal portions 98 and the terminals 64. Each terminal portion 98 may include an upper portion 100 and a lower portion 102. The upper portion 100 includes a top 104 and at least one side surface 106 cooperating to define a cavity 112 received on the stud 70 of the terminal 64. The shape of the cavity 112 may conform with the shape of the stud 70 to form an interference fit between the stud 70 and the upper portion 100. The cavity 112 may be slightly smaller than the stud increasing the strength of the interference fit. In the illustrated embodiment, the upper portion 100 is a circular cylinder to match the circular cylinder stud 70, however the upper portion may be a different shape in other embodiments.

The lower portion 102 includes a wall 108 and a surface 110 interconnecting the wall 108 and the side surface 106 of the upper portion 100. The shape of the lower portion 102 may conform to the shape of the base 68 to create an interference fit between the lower portion 102 and the base 68 when the lower portion is received on the base 68. In some embodiments, both the upper portion and the lower portion form an interference fit. In other embodiments, only the upper portion or the lower portion create an interference fit with the terminal 64.

The housing 92 is disposed around the busbars 94 to electrically insulate and secure the busbars 94. The shape of the housing 92 may conform to the shape of the busbars 94 and the terminals 64. Conforming the shapes of the housing 92 and the busbar 94 with the shape of the terminal 64 reduces the size of the busbar module 90. For example, the housing 92 may include a main portion 114 disposed over the lower portion 102 of the busbars 94 and the base 68 of the terminals 64. The main portion 114 may have a continuous cross-section along a length of the housing 92 and may include opposing walls 118 extending downwardly from a top 120. The housing 92 may also include a plurality of pockets 116 aligned with the studs 70. The pockets 116 receive the upper portion 100 of the busbars 94 and the stud 70 of terminals. The pockets 116 may include a top 122 engaged with the top 104 and a sidewall 124 engaged with the side surface 106. The shape of the pockets 116 may correspond with the shape of the busbars 94 and terminals 64. In the illustrated embodiment, the pockets 116 are a circular cylinder, which matches the circular cylinder shape of both the studs 70 and the upper portions 100. In other embodiments, the pockets 116 may have a different shape.

Figure 5:
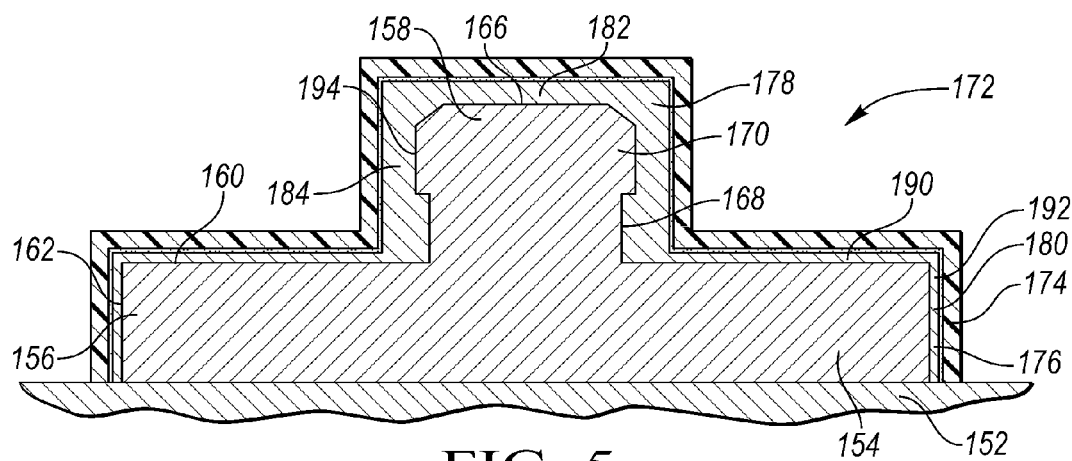
FIG. 5 is a section view of another battery assembly illustrating a cross-section of the terminal and busbar module.

FIG. 5 illustrates a cross-sectional view of the terminal and the busbar module of another battery assembly. The battery assembly includes a plurality of cells 152 stacked in an array as illustrated in FIG. 2. Each of the cells 152 includes a terminal 154 extending from a side of the cell 152. The terminal 154 may include a base 156 and a stud 158 extending upwardly from the base 156. The base 156 may be prismatic and include a top 160, a pair of opposing sidewalls 162 and a pair of opposing end walls (not shown). The stud 158 may have a smaller footprint than the base 156. The stud 158 may be a circular cylinder in shape and includes a top 166 and a sidewall 168.

The battery assembly 150 further includes a busbar module 172 having a housing 174 and a plurality of busbars 176. Each busbar 176 includes an upper portion 178 and a lower portion 180. The upper portion 178 includes a top 182 and at least one sidewall 184 extending from the top 182. The lower portion 188 includes a horizontal wall 190 and a vertical wall 192.

The busbar 176 is received on the terminal 154 with the upper portion 178 disposed over the stud 158 and with the lower portion 180 disposed over the base 156. One of the busbar 176 and the terminal 154 includes a projection 170 and the other of the busbar 176 and the terminal 154 includes a receptacle 194 for receiving the projection to create a snap fit between the busbar 176 and the terminal 154. In the illustrated embodiment, the stud 158 is a circular cylinder that includes an annular snapping ring 170 extending outwardly from the sidewall 168. The upper portion 178 is also a circular cylinder and includes a groove 194 for receiving the snapping ring 170.

Alternatively, the projection 170 may extend from one or both of the sidewall 162 and the sidewall 168 and the recess may be in the sidewall 184 and/or the vertical wall 192. For example, the stud 158 may be prismatic and include a pair of opposing sidewalls and the upper portion 178 may be prismatic and include a pair of vertical walls. The pair of opposing sidewalls on the stud 158 may each include a projection received in a receptacle of a corresponding vertical wall of the upper portion 170. In other embodiments, the projection 170 is located on the busbar 176 and the receptacle 194 is located on the terminal 154.

Figure 6:
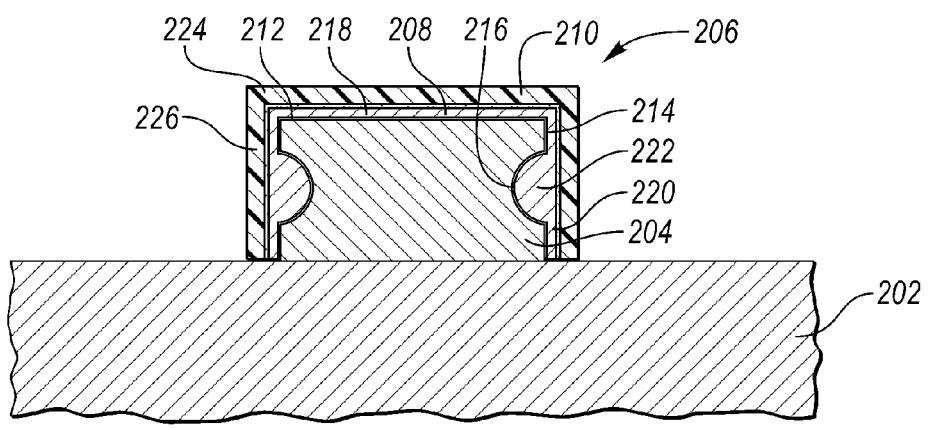
FIG. 6 is a section view of yet another battery assembly illustrating a cross-section of the terminal and busbar module.

FIG. 6 illustrates a cross-sectional view of the terminal and the busbar module of a another battery assembly. The battery assembly includes a plurality of cells 202 stacked in an array as illustrated in FIG. 2. Each of the cells 202 includes a terminal 204 extending from a side of the cell 202. The terminal 204 may be prismatic or a circular cylinder. The terminal 204 may include a top 212 and at least one sidewall 214 extending from the top. The terminal 204 may include at least one receptacle 216 recess into the at least one sidewall 214.

The battery assembly further includes a busbar module 206 having a housing 210 and a plurality of busbars 208. The housing includes a top 224 and a pair of opposing sidewalls 226. Each busbar 208 includes a terminal receiving portion having a top 218 and at least one sidewall 220. The terminal portion is received onto the terminal 204 and may be prismatic or a circular cylinder to correspond with the shape of the terminal 204. The busbar 208 may include a projection 222 extending from the least one sidewall 220. The projection 222 cooperates with the receptacle 216 to create a snap fit between the busbar and the terminal. Alternatively, the projection may be located on the terminal 204 and the receptacle may be located on the busbar 208.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery comprising:
   a cell including a cylindrical terminal having a top and at least one exterior sidewall; and a busbar including an interior that receives and circumscribes the cylindrical
terminal, wherein the exterior sidewall defines a snapping ring projecting outwardly from the sidewall, and a side surface of the interior defines a receptacle for receiving the snapping ring to create a snap fit.

2. The traction battery of claim 1 further comprising:
an additional cell including an additional terminal defining an additional surface having a top and at least one sidewall, wherein
the busbar further includes an additional interior defining a top engaging with the top of the additional terminal and at least one side surface engaging with the sidewall of the additional terminal, wherein one of the side surface of the additional interior and the sidewall of the additional terminal includes a projection and the other of the side surface of the additional interior and the sidewall of the additional terminal includes a receptacle for receiving the projection.

3. The traction battery of claim 2 further comprising a busbar module spanning between the cells and housing the busbar and terminals.

4. The traction battery of claim 3 wherein the busbar module further comprises a top and a pair of walls extending from the top along two opposing sides of the top, wherein the top of the busbar module is adjacent to a top of the interior and each of the walls is adjacent to a side surface of the interior.

5. The traction battery of claim 3 further comprising dielectric adhesive disposed between the busbar module and the busbar to attach the busbar to the busbar module.

6. The traction battery of claim 1 further comprising:
an additional cell including an additional cylindrical terminal having a top and at least one sidewall; and
the busbar further includes an additional interior that receives and circumscribes the additional cylindrical terminal, wherein the sidewall of the additional terminal defines a snapping ring projecting outwardly from the sidewall, and a side surface of the additional interior defines a receptacle for receiving the snapping ring of the additional terminal to create a snap fit.

7. The traction battery of claim 1 wherein the interior is a circular cylinder and further includes a groove configured to receive the snapping ring.

8. The traction battery of claim 1 wherein the terminal has a prismatic shape and the at least one sidewall further includes a pair of opposing sidewalls cooperating with a top of the terminal to define a first surface, and wherein the at least one side surface of the busbar further includes a pair of opposing side surfaces cooperating with a top of the interior to define a second surface conforming in shape with the first surface, wherein each of the side surfaces engages with one of the sidewalls.

9. The traction battery of claim 8 wherein each of the sidewalls includes a snapping ring and each of the side surfaces includes a receptacle for receiving one of the projections to create a snap fit.

10. A traction battery assembly comprising:
a cell including a terminal having a base attached to the cell and a stud distal to the cell, the base having a larger footprint than the stud; and
a busbar defining an interior having an upper portion conforming in shape to the stud and a lower portion conforming in shape to the base, the busbar being received over the terminal with the upper portion receiving the stud and the lower portion receiving the base, wherein one of the upper portion and the stud includes a projection and the other of the upper portion and the stud includes a receptacle for receiving the projection to create a snap fit between the stud and upper portion.

11. The traction battery assembly of claim 10 wherein the stud is a circular cylinder and includes an annular snapping ring disposed around a periphery of the stud.

12. The traction battery assembly of claim 11 wherein the interior of the busbar is a circular cylinder and further includes a groove configured to receive the annular snapping ring.

13. The traction battery assembly of claim 10 wherein one of the base and the lower portion includes a projection and the other of the base and the lower portion includes a receptacle for receiving the projection to create a snap fit between the lower portion and the base.

14. The traction battery assembly of claim 10 wherein the base is prismatic and the stud is a circular cylinder.

15. The traction battery assembly of claim 10 further comprising a busbar module covering the busbar and the terminal, the busbar module including a main portion disposed over the lower portion of the busbar and the base, and a pocket disposed over the upper portion of the busbar and the stud.

16. The traction battery assembly of claim 15 further comprising dielectric adhesive disposed between the busbar module and the busbar to attach the busbar to the busbar module.

17. A traction battery assembly comprising:
an array of cells including a plurality of terminals arranged in a row and extending along a length of the array, each of the terminals being attached to one of the cells and defining a first shape;
at least one busbar including a pair of terminal portions that each define a second shape conforming to the first shape, wherein one of the terminal portions is received on one of the terminals and the other of the terminal portions is received on an adjacent terminal to electrically connect two of the cells, wherein one of the terminals and the terminal portions further includes a projection and the other of the terminals and the terminal portions further includes a receptacle for receiving the projection to form a snap fit; and
a busbar module (BBM) extending along the length of the row and disposed over the row, the BBM including busbar receiving portions aligned with the terminals, each of the busbar receiving portions defining a third shape conforming to the first and second shapes, wherein the at least one busbar is received within one of the busbar receiving portions.

18. The traction battery assembly of claim 17 wherein each of the terminals further includes a base attached to the cells and a stud distal to the base and wherein each of the terminal portions further includes an upper portion engaging the stud and a lower portion engaging the base, and wherein each of the busbar receiving portions further includes a main portion engaging the lower portion, and a pocket extending from the main portion and receiving one of the upper portions and studs therein.

19. The traction battery assembly of claim 18 wherein the stud is a circular cylinder, wherein the upper portion is a circular cylinder, and wherein the pocket is a circular cylinder.

* * * * *